Figure 1:
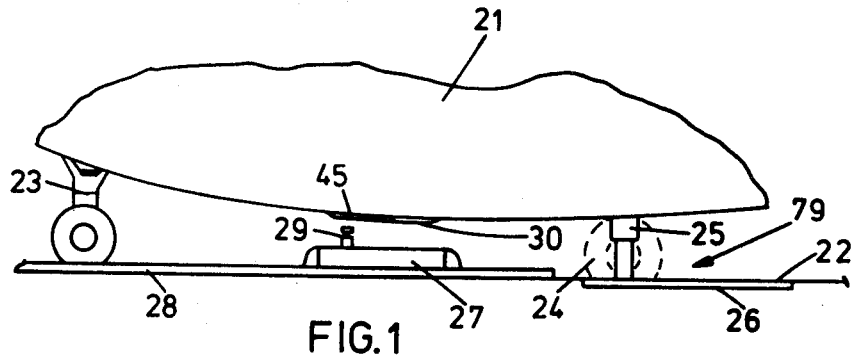

United States Patent [19]

Deady

[11] 4,397,254
[45] Aug. 9, 1983

[54] APPARATUS FOR MOVING A HELICOPTER ALONG A DECK

[75] Inventor: Martin A. Deady, Somerset, England

[73] Assignee: Westland Aircraft Limited, Somerset, England

[21] Appl. No.: 169,293

[22] Filed: Jul. 15, 1980

[30] Foreign Application Priority Data

Jul. 25, 1979 [GB] United Kingdom ............... 7925865

[51] Int. Cl.³ ............................................ B63B 35/50
[52] U.S. Cl. ................................... 114/261; 244/116
[58] Field of Search ............................. 114/261, 262;
244/114 R, 115, 116, 50; 180/14 C, 14 R;
280/491 A, 479 R, 515

[56] References Cited

U.S. PATENT DOCUMENTS

| | | | |
|---|---|---|---|
| 2,867,451 | 1/1959 | Repke | 180/14 C |
| 3,303,807 | 2/1967 | Stewart et al. | 244/114 R |
| 3,502,286 | 3/1970 | Warren | 244/115 |
| 3,640,490 | 2/1972 | Backken | 244/116 |
| 3,790,111 | 2/1974 | Mesnet et al. | 244/116 |
| 3,830,452 | 8/1974 | Seay | 244/116 |

Primary Examiner—Sherman D. Basinger
Attorney, Agent, or Firm—Larson and Taylor

[57] ABSTRACT

The apparatus comprises a trolley movable along a trackway on the deck. A vertically extendable and retractable probe is carried by a laterally movable mounting structure adjacent one end of the trolley and has an upper end arranged for location in an engagement provided beneath the helicopter fuselage. The probe is power operated and is arranged to be capable of selectively applying a downward force on the helicopter when the probe is located in the engagement, and a locking device is provided to selectively lock the probe mounting structure in a centralized position on the trolley. In one described embodiment, the apparatus is particularly adapted for use with a harpoon type deck-lock system.

14 Claims, 26 Drawing Figures

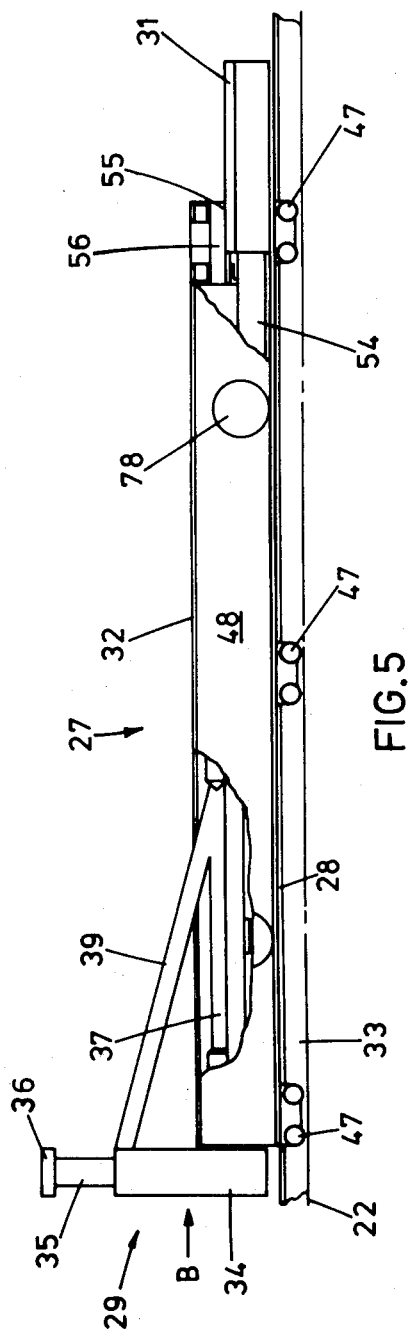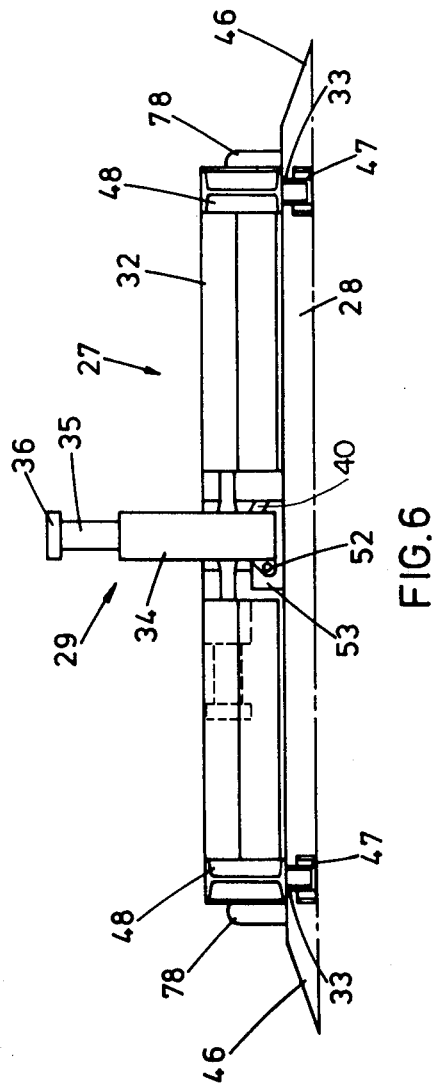

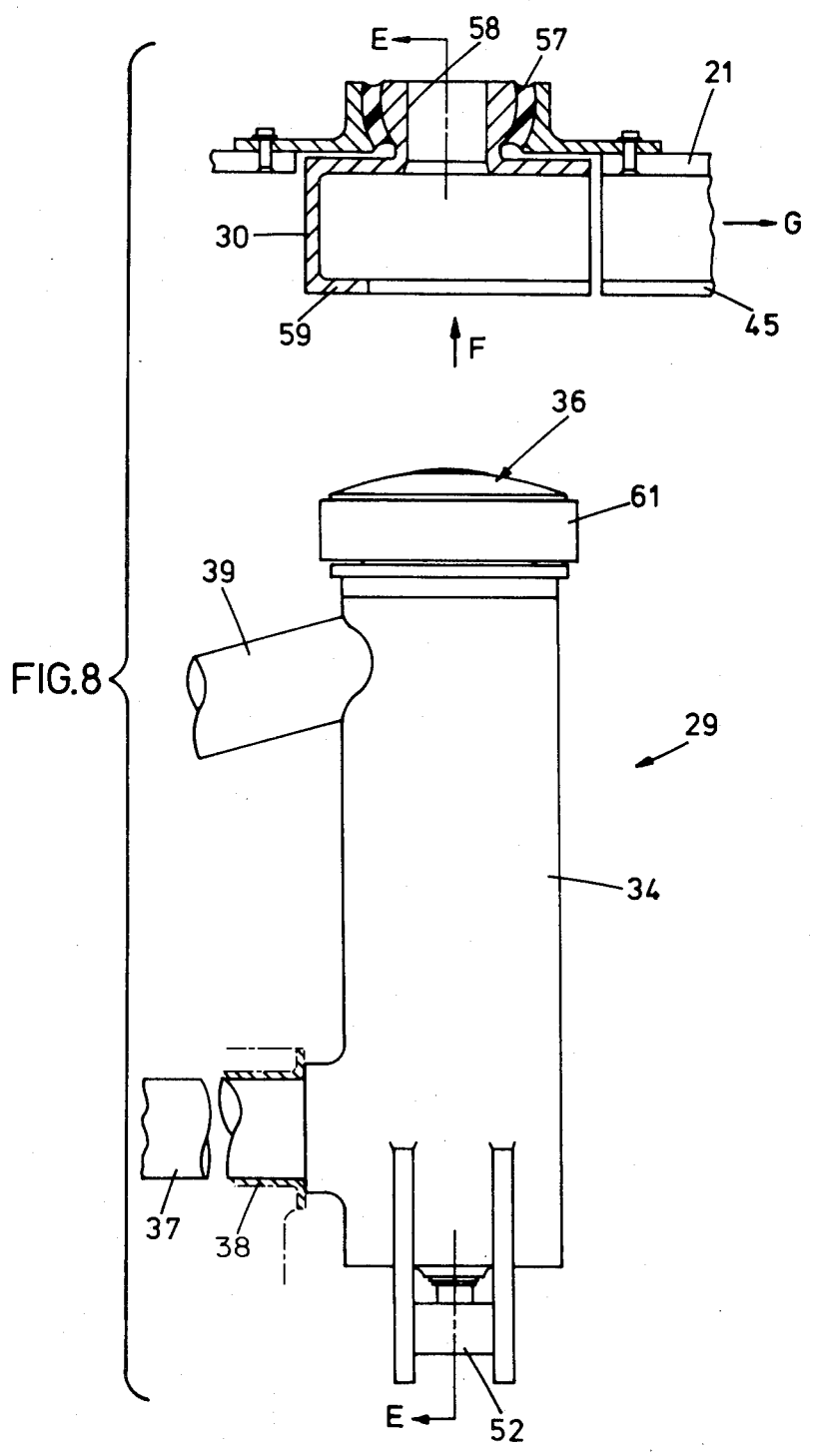

APPARATUS FOR MOVING A HELICOPTER ALONG A DECK

This invention relates to apparatus for moving a helicopter along a deck of a ship.

The landing of a helicopter on the deck of a ship, particularly in bad weather conditions, is a very hazardous task and several prior proposals have been made to reduce the risks involved.

One such device in current use is the harpoon deck-lock system in which a harpoon carried by the helicopter is deployed immediately on touch-down to engage in and grip a grid portion fixedly attached to the deck surface. The harpoon is normally hydraulically operated and is arranged to provide a retaining force to pull the helicopter onto the deck surface. The helicopter is normally fitted with a castorable, wheeled undercarriage, and can be rotated about the harpoon fixing by thrust from the tail rotor to facilitate take-off and to align the helicopter with a desired direction of movement across the deck surface.

Another device to facilitate landing of a helicopter is the so-called "bear-trap" device, in which a trap, fixedly attached to the deck, is arranged to grip a downwardly extending probe carried by the helicopter when the helicopter has been brought down under the control of a cable lowered from the helicopter and attached to a powered winch usually located beneath the deck. One example of such a device is disclosed in U.K. patent specification No. 1,275,468, and one of its disadvantages will be readily apparent from a viewing of FIG. 1 as constituting the significant modification necessary to the ship's deck and the extensive bulky equipment that is necessary on the ship to operate the system.

Having safely landed the helicopter on the deck, there remains the problem of moving it for example into a hangar area either to allow further helicopter(s) to land or to effect servicing or maintenance procedures. This also can be an extremely hazardous task in bad weather conditions, since severe motion of the deck can result in loss of control of the helicopter during its movement and may result in complete loss of the helicopter into the water. Not surprisingly, therefore, there have been many prior proposals relating specifically to the movement of a helicopter across a deck, e.g., the devices and arrangements of U.K. patent specification No. 1,403,425 and U.S. Pat Nos. 3,785,316 and 3,830,452. The main disadvantages of these proposals is that they require personnel on the deck to secure the helicopter which is undesirable, and/or they require extensive ship-borne equipment.

Another prior proposal for moving a helicopter and which is designed specifically for use with the aforementioned "bear-trap" deck-lock device is disclosed in U.K. patent specification No. 1,285,144. In this arrangement, a movable guided dolly is provided for attachment to the probe in order to move the helicopter, and embodiments for moving helicopters having either skid or wheeled undercarriages are described. In both embodiments, personnel are required on deck to attach the helicopter to the dolly and, in the case of the wheeled undercarriage device, precise positioning of the helicopter is necessary in order to facilitate such attachment, and this may be difficult in extreme weather conditions. Furthermore, in the case of the device for moving a wheeled undercarriage helicopter, it will be apparent, since the helicopter is hauled along by the probe depending from the fuselage, that moment loads have to be reacted at the helicopter fuselage, thereby increasing the complexity and structural weight of the probe mounting.

Consequently, there is a need in the art for a simple and efficient apparatus for moving a helicopter on the deck of a ship. Preferably, such apparatus should necessitate minimum modification to existing deck surfaces, should be operable with existing deck-lock systems and, preferably, should require no personnel on the deck during either landing or manoeuvring of the helicopter.

Accordingly, the invention provides apparatus for moving a helicopter on the deck of a ship, the apparatus including a trackway on the deck and a movable trolley located on the trackway, wherein the trolley includes a vertically extendable and retractable probe having an upper end arranged for location in engagement means beneath the helicopter fuselage, the probe mounting means carried by the trolley and laterally movable relative thereto, and locking means operative to lock the mounting means and thereby the probe in a central position on the trolley.

The probe may be power operated so as to provide a downward force on the helicopter, tending to hold the helicopter onto the deck when the probe is located in the engagement means. Preferably, the probe is hydraulically operated.

The probe mounting means may comprise a beam structure slidably mounted on spaced-apart parallel guide bars carried by the trolley. Conveniently, the locking means may be located on the beam structure and may be operatively associated with a laterally extending locking bar carried by the trolley so as to be capable of locking the mounting means in any position relative the trolley. The locking means may comprise a hydraulically operated sprag lock mechanism.

Said engagement means on the helicopter may comprise a trap and guide rails arranged to guide the upper end of the probe into the trap as a result of relative movement between the helicopter and the trolley. The trap may include a vertically extending aperture for engagement by a lock plunger carried by the probe and, preferably, the lock plunger is spring loaded so as to protrude from an upper end of the probe and is selectively movable by hydraulic pressure into a retracted position within the probe.

In one embodiment of the invention adapted for use with a so-called harpoon deck-lock system, the trolley may be provided with a longitudinally movable portion remote from the probe mounting means and having an upper surface configured for operative association with the deck-lock system. Preferably, the movable portion is power operated by any suitable means such as a hydraulic jack for movement between extended and retracted positions.

A plurality of guide rollers may be provided on the trolley and may be located in parallel longitudinally extending slots. Preferably the slots have an inverted T-shape in cross-section, in order to react the downward force applied to the helicopter through the probe.

In one form of the invention suitable for use in modifying an existing deck surface, the slots may be provided in a trackway having an upper surface raised from and substantially parallel to the deck surface and longitudinally extending ramp portions along each side thereof. Conveniently, the trolley may be provided with a plurality of wheels arranged to run along the upper surface of the trackway.

Power means are provided to move the trolley along the trackway and may comprise remotely located winch means attached to the trolley by one or more cables. Conveniently the cable(s) may be routed along the T-shaped slot.

Figure 2:
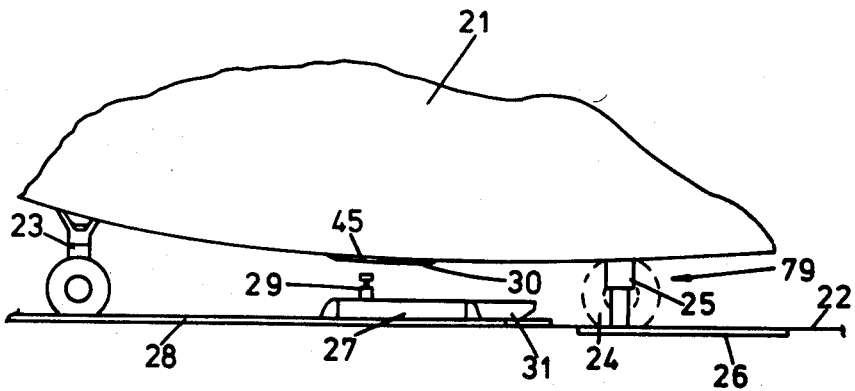
Figure 3:
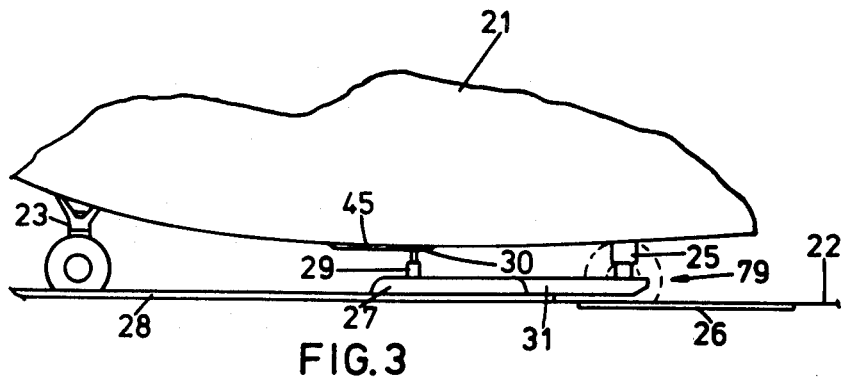
Figure 4:
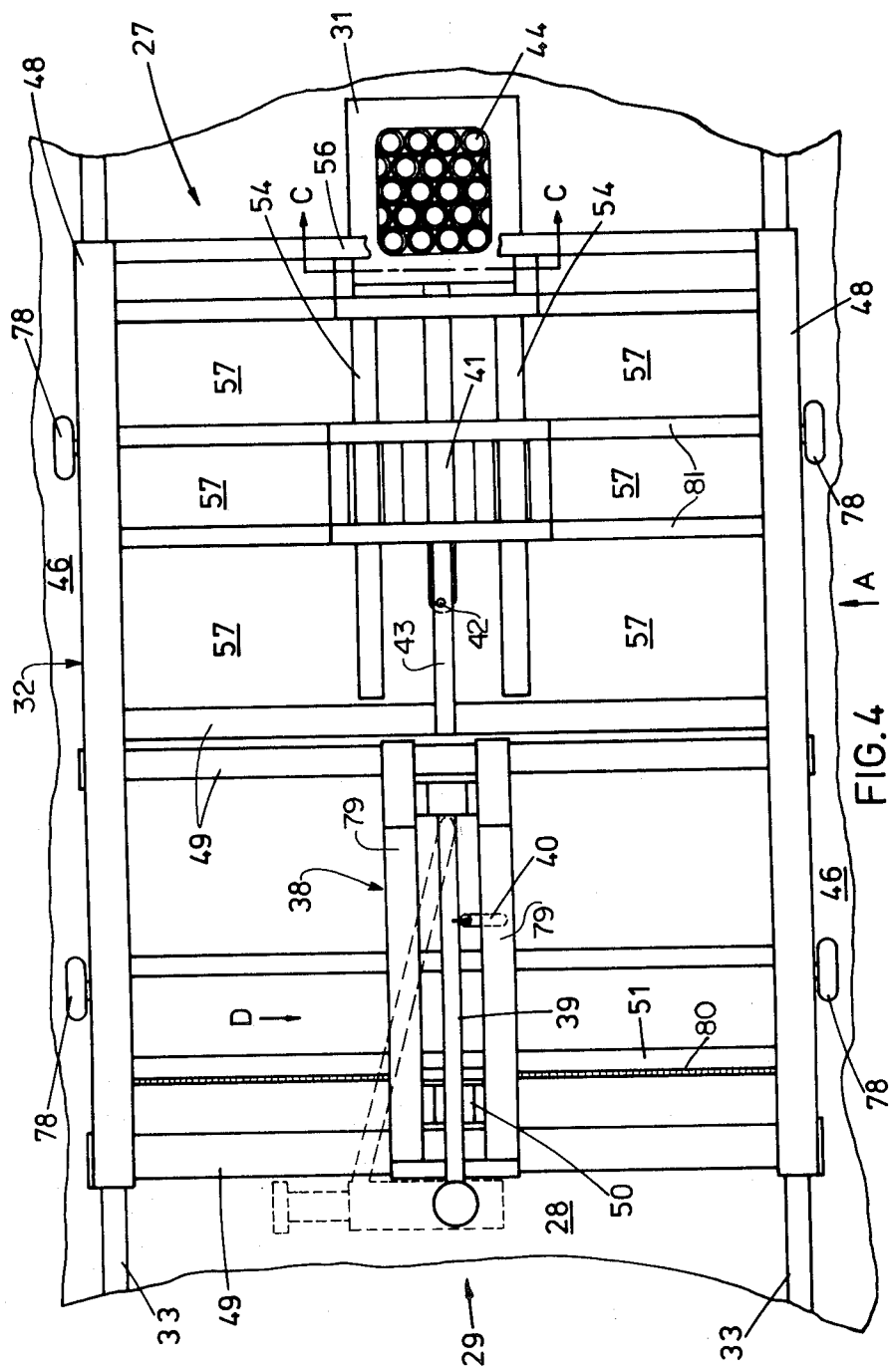
Figure 7:
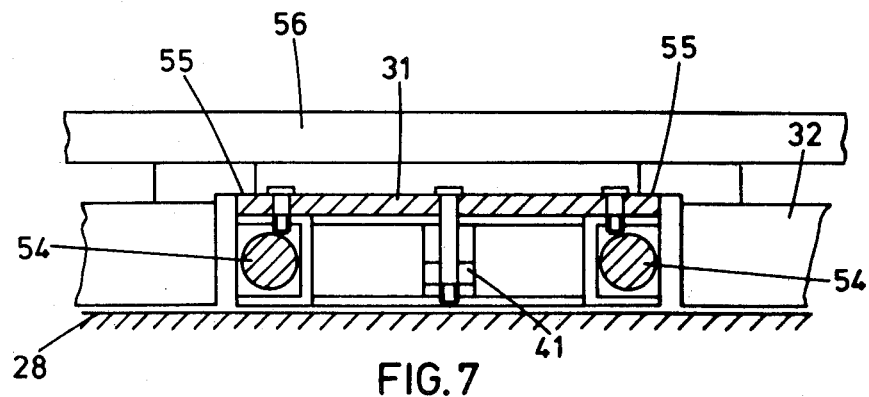
Figure 10:
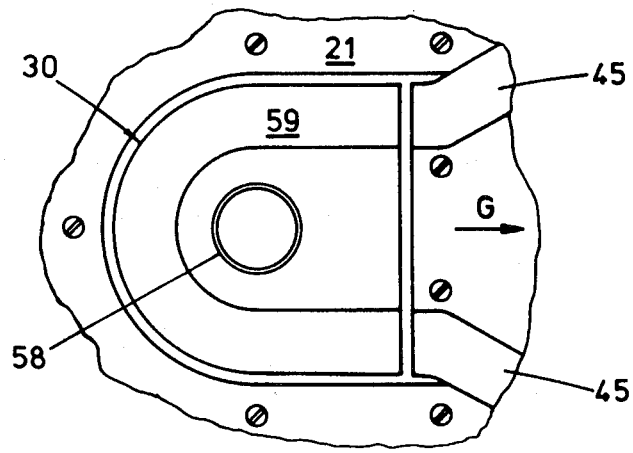
Figure 9:
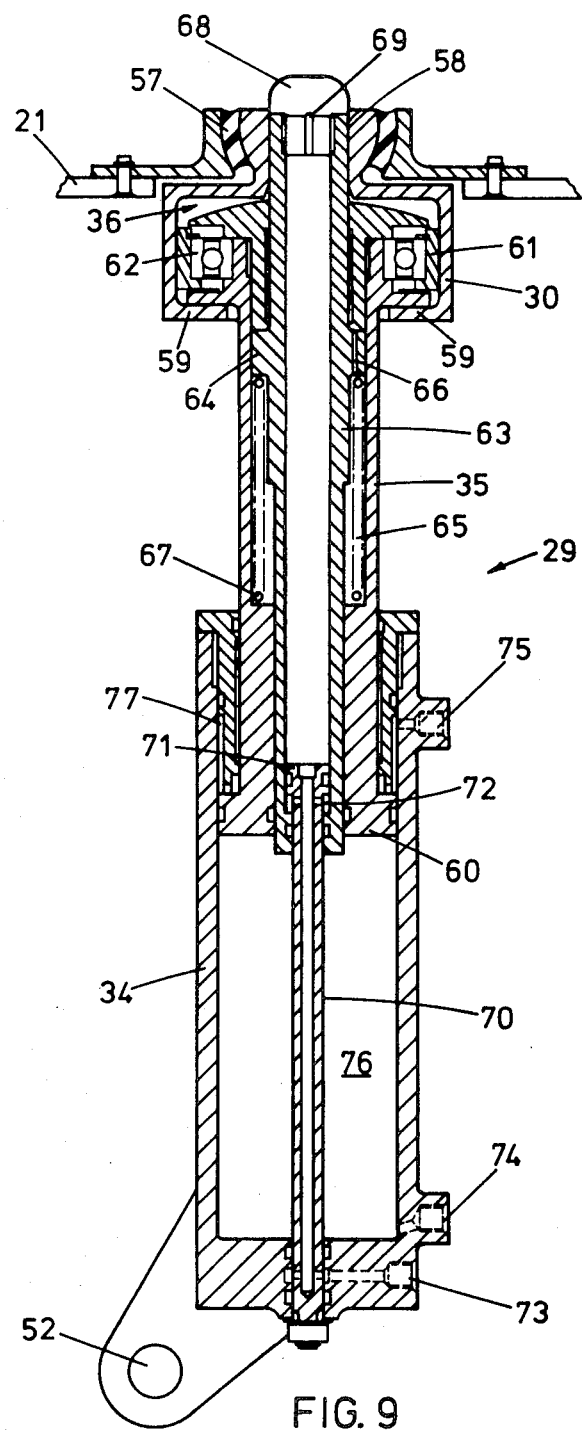

The invention will now be described by way of example only and with reference to the accompanying drawings in which:

FIG. 1 is a fragmentary side elevation of a helicopter on a ship's deck and illustrating apparatus according to one embodiment of the invention, FIGS. 2 and 3 are views similar to FIG. 1 and illustrating apparatus according to a second embodiment, FIG. 4 is a plan view of part of the apparatus of the embodiment of FIGS. 2 and 3, FIG. 5 is a side elevation taken in the direction of arrow A on FIG. 4, FIG. 6 is an end elevation taken in the direction of arrow B on FIG. 5, FIG. 7 is a fragmentary sectioned elevation taken on lines C—C on FIG. 4, FIG. 8 is a side elevation of part of the apparatus taken in the direction of arrow D on FIG. 4 and includes details of interface apparatus on the helicopter, FIG. 9 is a sectioned view taken on lines E—E of FIG. 8 and showing the apparatus engaged beneath the helicopter, FIG. 10 is a fragmentary bottom plan elevation taken in the direction of arrow F on FIG. 8, FIGS. 11A to 11H inclusive are schematic illustrations of a sequence of operations of apparatus according to the invention to move a helicopter having a particular type of undercarriage configuration, FIGS. 12A to 12H are schematic illustrations of a sequence of operations for moving a helicopter having a further type of undercarriage.

Referring now to FIG. 1, a helicopter 21 is shown on the deck 22 of a ship.

The helicopter 21 has a tricycle undercarriage comprising a castorable nosewheel 23 located centrally beneath a fuselage and two castorable rear wheels 24 (shown in broken line) located laterally one on each side of a longitudinal centreline. The helicopter 21 is shown secured to the deck 22 by a deck-lock system generally indicated at 79 which, for illustrative purposes is shown as a harpoon deck-lock system comprising a harpoon 25 carried by the helicopter 21 engaged in a grid 26 permanently fixed in the surface of the deck 22.

A trolley 27 is positioned beneath the fuselage of the helicopter 21 and is movable along a trackway 28 fixed to the surface of the deck 22. The trolley 27 includes a vertically extendable probe 29 having an upper end adapted for location in engagement means 30 provided on the lower surface of the fuselage of the helicopter 21. Guide rails 45 are associated with the engagement means 30 beneath the fuselage for a purpose to be hereinafter described.

The embodiment of FIGS. 2 and 3 is similar to that of FIG. 1 except that the trolley 27 is particularly adapted for use with the harpoon deck-lock system 79. To this end, the trolley 27 includes a generally horizontally extendable portion 31 shown in its retracted position in FIG. 2. An upper surface of the portion 31 has a grid configuration compatible with the grid 26 in the deck 22.

Referring now to FIG. 3, it will be seen that the probe 29 is located and locked in the engagement means 30 and that the harpoon 25 has been disengaged from the grid 26 in the deck 22 and re-engaged in the grid provided at the outer end of the extended portion 31 of the trolley 27.

FIGS. 4 to 6 inclusive show details of the trolley 27 used in the embodiment of FIGS. 2 and 3.

The trolley 27 comprises a generally rectangular body 32 having guide rollers 47 attached beneath each corner and intermediate the length of side frames 48. The rollers 47 are located in parallel longitudinally extending slots 33 of inverted T-shape provided in the low profile trackway 28 which has an upper surface raised from and parallel to the deck surface and longitudinally extending ramp portions 46 along each side. Winch cables (not shown) extend along the slots 33 from removely located winch means and are attached to each end of the trolley 27.

Two wheels 78, having solid rubber tyres, are located externally of side frames 48 to run along the upper surface of trackway 28.

The probe 29 comprises a hydraulic jack having a casing 34 housing a ram 35, the ram 35 having an upper end 36 arranged for location in the engagement means 30 provided beneath the helicopter fuselage 21. The casing 34 is attached at one end of a horizontal longitudinally extending strut 37 pivotally located for rotation about its axis on mounting means comprising a laterally slidable beam structure 38. The structure 38 includes parallel spaced-apart beams 79 located at one end of the body 32 and is slidably mounted on spaced-apart parallel guide bars 49 extending between the side frames 48. A hydraulically operated sprag lock mechanism 50 is carried by the structure 38 and is operatively associated with a toothed surface 80 of a laterally extending locking bar 51. A pin 52 located adjacent a lower end of casing 34 (see also FIGS. 8 and 9) is arranged for location in a hydraulically operated locking device 53. Locking device 53 is spring loaded to engage pin 52 as the probe 29 moves from the horizontal position (depicted in phantom in FIG. 6) to the vertical operational position.

An angled strut 39 extends between an upper end of the casing 34 and the strut 37 to support the probe 29 in one plane, and a hydraulic jack 40 extends between the strut 39 and the structure 38 in a plane perpendicular to the plane of the strut 39.

It will be apparent, therefore, that extension and retraction of the hydraulic jack 40 serves to move the probe 29 between a generally horizontal stowed position shown in broken outline in FIGS. 4 and 6 and a vertical operational position shown in full outline in FIGS. 4 to 6 inclusive, and that lateral sliding movement of structure 38 assists in correctly locating the probe 29 in respect of the engagement means 30 on the helicopter. Also, when the probe 29 is in its vertical operational position, the strut 39 and locking device 53 combine to rigidly support the probe 29 in any lateral direction.

In the illustrated embodiment, the trackway 28 terminates in proximity with the grid 26 fixedly attached to the deck of the ship (FIGS. 2 and 3) which forms the shipborne part of a harpoon deck-lock system. The longitudinally extendable portion 31 of trolley 27 is located at an end of the body 32 remote from the laterally movable beam structure 38, the portion 31 being operable by a hydraulic jack 41 attached at one end at 42 to strut 43 extending at right angles from guide bar 49 of body 32 and at the other end, to portion 31 so as to move portion 31 between a retracted position shown in FIGS. 4 and 5 and the extended position illustrated in FIG. 3. The upper surface of an outer end of portion 31 is provided with a grid 44 compatible with the grid 26 in the deck 22.

The portion 31 is supported by two laterally spaced-apart guide bars 54 slidably mounted in cross beams 81 on the body 32, and so that upper side surfaces of the portion 31 engage at 55 with surfaces of a support structure 56 provided on the body 32 (FIG. 7).

The individual areas 57 of the trolley 27 house operating equipment such as hydraulic and electric equipment and an electrical control system, and are covered by individual access panels (not shown). Conveniently, winch cables and electric power and control cables are routed along the slots 33.

FIGS. 8 to 10 inclusive illustrate details of the construction of the probe 29 and the interface equipment carried by the helicopter.

Referring now to FIG. 8, the probe 29 is shown in its vertical operational position with its upper end 36 retracted into the casing 34, and in alignment with the trap 30 attached to the underside of the helicopter fuselage 21. As illustrated in FIGS. 8 and 10, the trap 30 is supported by a spherical elastomeric mount 57 having a central vertically extending aperture 58, and comprises a U-shaped structure having an inwardly extending flange 59 around three sides thereof located with its open non-flanged side aligned with the ends of converging guide rails 45 that are also provided with inwardly extending flanges. The front of the helicopter is in the direction of arrow G on FIGS. 8 and 10.

FIG. 9 illustrates constructional details of the probe 29 which is illustrated in its extended position with its upper end 36 engaged in the trap 30. The casing 34 has an open upper end housing the hollow ram 35 which has a piston head 60 at its lower end. The upper end 36 of the ram 35 has a dome-shaped upper surface carrying a guide roller 61 supported by a ball bearing 62.

An upper end of a centrally located hollow lock plunger 63 is slidably mounted in a bore in the upper end 36, and a lower end of the plunger 63 is slidably mounted in a bore in the ram 35. An intermediate flange 64 on the plunger 63 is located in a chamber 65 in the ram 35 and is provided with an orifice 66. A spring 67, located in chamber 65, acts on the flange 64 to urge the lock plunger 63 into the position illustrated in FIG. 9 in which it protrudes from the domed upper surface of upper end 36. A rounded cap 68 provided with a vent orifice 69 is provided at the upper end of lock plunger 63.

A lower end of lock plunger 63 is slidably located around the circumference of a hollow pintle 70 supported from the body 34. The pintle 70 has a piston head 71 located in the bore of the lock plunger 63 and spaced-apart from the lower end thereof to form an annular chamber 72.

Three threaded connections 73, 74 and 75 are provided in the body 34 for connection to a controlled supply of pressurised hydraulic fluid. Connection 73 is connected through the bore of pintle 70 to the chamber 72, connection 74 is connected to a chamber 76 in the body 34 at one side of the piston head 60 on the ram 35, and connection 75 is connected to an annular chamber 77 on the other side of the piston head 60.

The sequence of operation of apparatus constructed in accordance with the invention and for a helicopter having a tricycle undercarriage with castorable nosewheel and mainwheels will now be described with reference to FIGS. 11A to 11H inclusive.

Figure 11A:
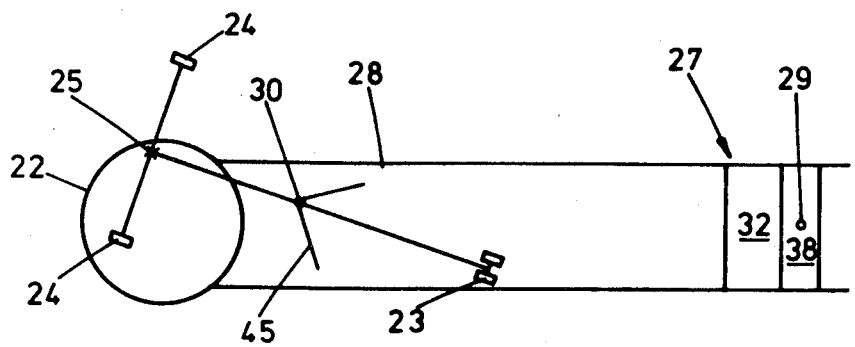

Referring now to FIG. 11A, the helicopter is shown on the deck of a ship and with the harpoon 25 engaged in the grid 22. It will be noted that the harpoon 25 is not centrally located in the grid 22 so that the helicopter is not aligned with the trackway 28. The trolley 27 is shown at one end of the trackway 28 remote from the grid 22.

Figure 11B:
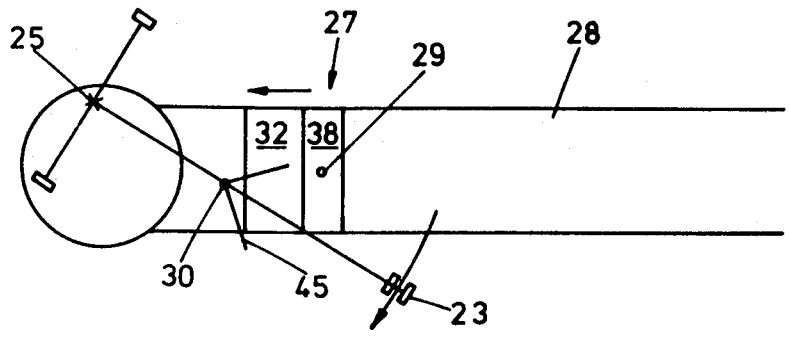

The nosewheel 23 is shown located on the trackway 28 so that the first manoeuvre, depicted in FIG. 11B, is to castor the nosewheels 23 and rotate the helicopter about the harpoon 25 and in a clockwise direction viewed from above until the nosewheel 23 is just clear of the trackway 28. It will be understood that at this stage, the helicopter engines and rotors are still operating so that rotation about the harpoon 25 is accomplished by lateral thrust from the tail rotor. The ram 35 of probe 29 is in its retracted position, and pressurised hydraulic fluid is supplied through connection 73 (FIG. 9) into chamber 72 to retract the lock plunger 63 against the force of spring 67 into the position shown in FIG. 8. The trolley 27 is then moved towards the helicopter until the probe 29 is located beneath the fuselage. Pressurised hydraulic fluid is supplied through connection 74 into chamber 76 (FIG. 9) to extend the ram 35 so that the domed surface of upper end 36 bears on the underside of the fuselage with a positive pressure of between 30 and 50 lbs. The pressure at connection 73 is released so that the cap 68 on lock plunger 63 is also urged against the underside of the helicopter by the force of spring 67.

Figure 11C:
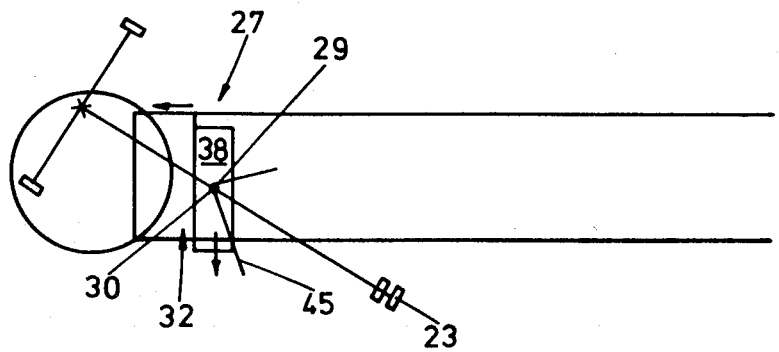

Further movement of the trolley 27 towards the helicopter engages the guide roller 61 at the upper end 36 of probe 29 in one of the guide rails 45 thus guiding the probe 29 into the trap 30 (FIG. 11C). This is permitted by lateral movement of the beam structure 38 on the trolley 27 on which the probe 29 is mounted as shown in FIG. 11C.

As the upper end 36 enters the trap 30, the pressure of spring 67 forces the lock plunger 63 upwardly into the aperture 58 in the trap 30 thereby locking the probe 29 to the helicopter. The hydraulic supply to the chamber 76 is released.

Figure 11D:
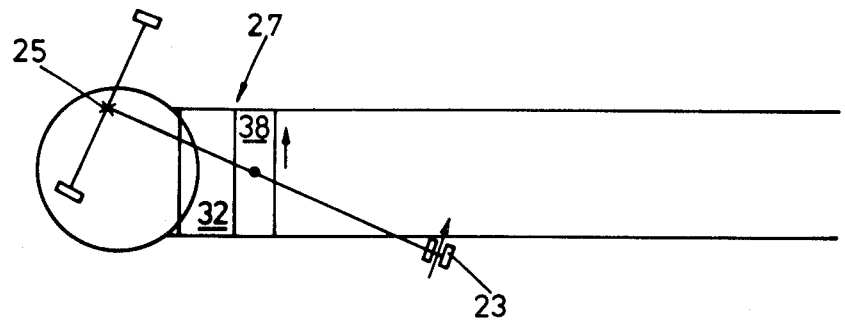

As shown in FIG. 11D, the helicopter is now rotated about the harpoon 25 in a counterclockwise direction viewed from above, which serves to move the beam structure 38 laterally on the trolley 27. As the beam structure 38 reaches its centralised position, the sprag lock 50 is actuated to lock structure 38 to the body 32 of trolley 27.

Figure 11E:
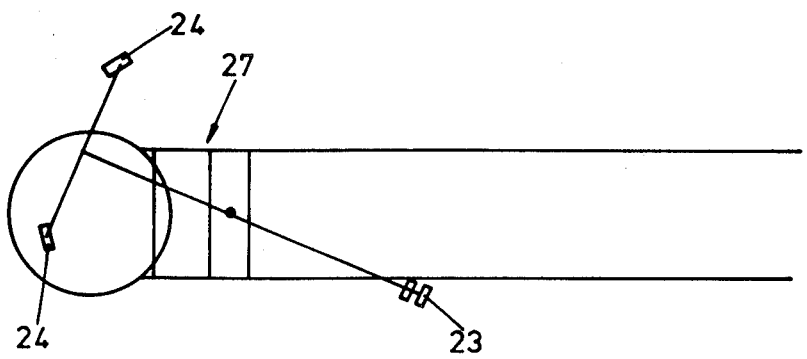
Figure 11F:
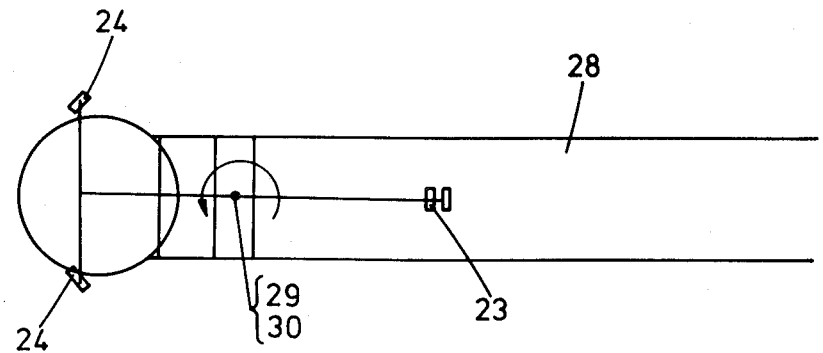

The mainwheels 24 are now castored as shown in FIG. 11E and the harpoon 25 is released from the grid. Lateral thrust from the tail rotor of the helicopter is now utilised to rotate the helicopter about the probe attachment in a counterclockwise direction viewed from above until the nosewheel 23 is located centrally of the trackway 28. It will be apparent that this manoeuvre automatically aligns the mainwheels 24 with the trackway 28 as shown in FIG. 11F.

Portion 31 of the trolley 27 is now extended by hydraulic jack 41 as shown in FIG. 3, and the harpoon 25 is re-engaged in the grid 44 formed in the upper surface of the portion 31, to provide a dual attachment of the helicopter to the trolley 27. The hold-down force exerted by the harpoon 25 is reacted through engagement of side surfaces 55 of portion 31 with mating surfaces on the body 32 (FIG. 7).

Figure 11G:
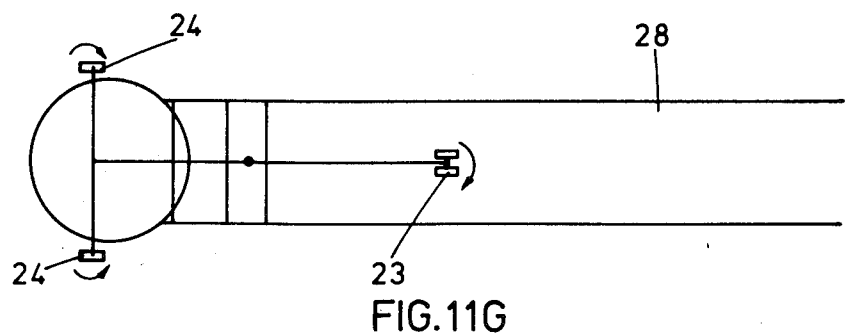
Figure 11H:
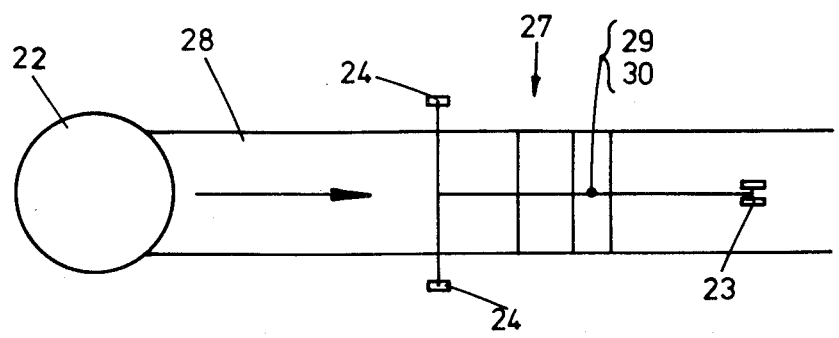

As shown in FIG. 11G, the nosewheel 23 and mainwheels 24 are now castored to the fore-and-aft position. The helicopter rotor is now stopped and the engine(s) shut down. If the helicopter is fitted with a foldable tail cone, this is now moved to the stowed position.

The trolley 27 is now moved along the trackway 28 to move the helicopter, through the attachment of the probe 29, into the hangar or stowage area on the deck.

It will be apparent that manoeuvres following engagement of the lock plunger 63 in the trap 30 are accomplished with the probe 29 unpressurised. However, in an emergency such as a movement of the deck beyond predetermined limits, pressurised hydraulic fluid is supplied to chamber 77 through connection 75 to exert a tension on the fuselage of about 5000 lbs. in order to positively retain the helicopter on the deck. This restraining force is reacted at the flange 59 on the trap 30 and at the rollers 47 in the slots 33 in trackway 28. Additionally, the sprag lock 50 can be actuated with the beam structure 38 in any laterally offset position to provide further restrain in an emergency. Preferably, the sprag lock is arranged to automatically engage when unpressurised so as to provide efficient locking of the beam structure 38 in the event of a failure of the hydraulic supply.

In order to illustrate the versatility of the apparatus of the invention, the sequence of operations shown in FIGS. 12A to 12H inclusive is in respect of a helicopter having a tricycle undercarriage in which the mainwheels 24 are non-castorable. In such a case it is necessary for the nosewheel 23 to be movable within a range between 90 degrees of the fore-and-aft position and a smaller angle on either side of the fore-and-aft position. Conveniently, this may be achieved by a castorable facility into the extreme 90 degrees position and a steerable facility throughout the restricted range and operable by the pilot.

Figure 12A:
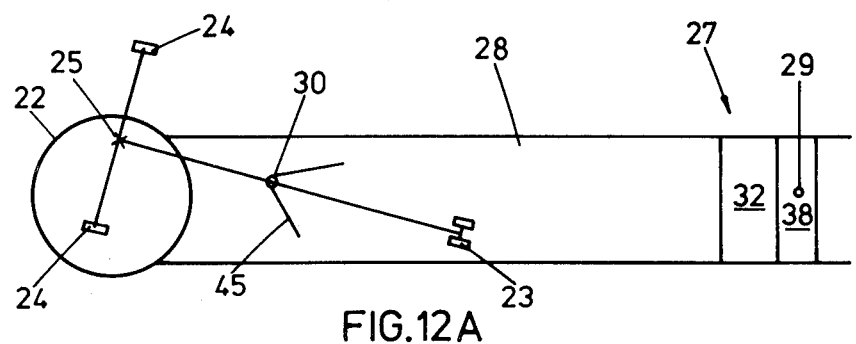
Figure 12B:
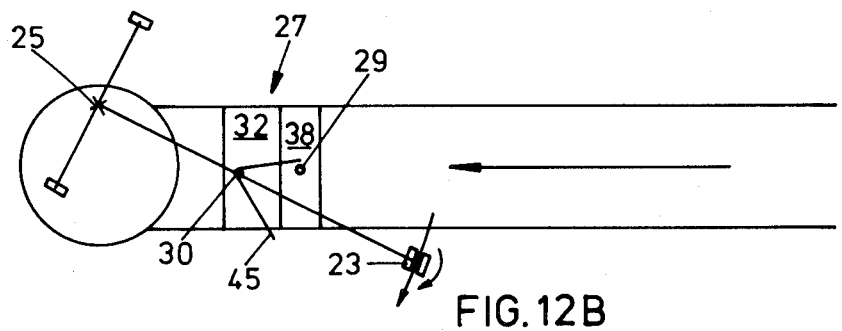
Figure 12C:
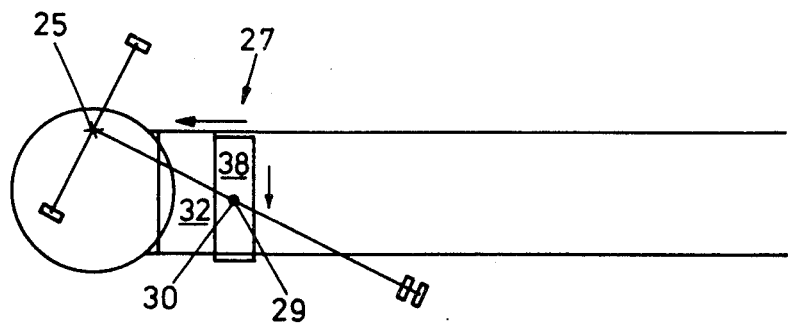

The sequence of operations shown in FIGS. 12A to 12C inclusive is identical to that previously described in relation to FIGS. 11A to 11C inclusive. At this stage in the sequence of FIG. 12, the rotors are stopped, the engine(s) shut down, and the tail cone folded to its stowed position.

Figure 12D:
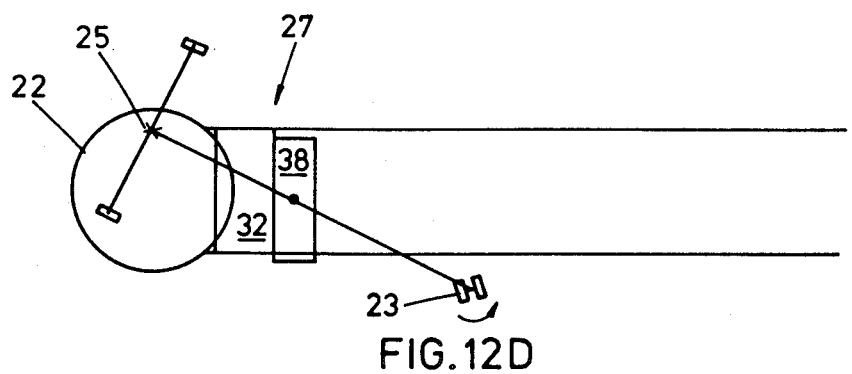
Figure 12E:
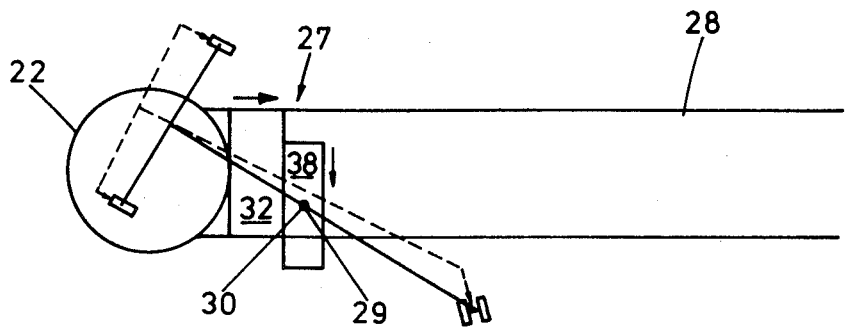

As shown in FIG. 12D, the nosewheels 23 are moved to an intermediate position. The harpoon 25 is then released from the grid 26 and the helicopter is retained in position by the probe 29. Referring now to FIG. 12E, the trolley 27 is moved along the trackway away from the grid 26 thereby moving the helicopter through the attached probe 29 from the position indicated by the broken line to that indicated in full line, this being permitted by lateral movement of the beam structure 38.

Figure 12F:
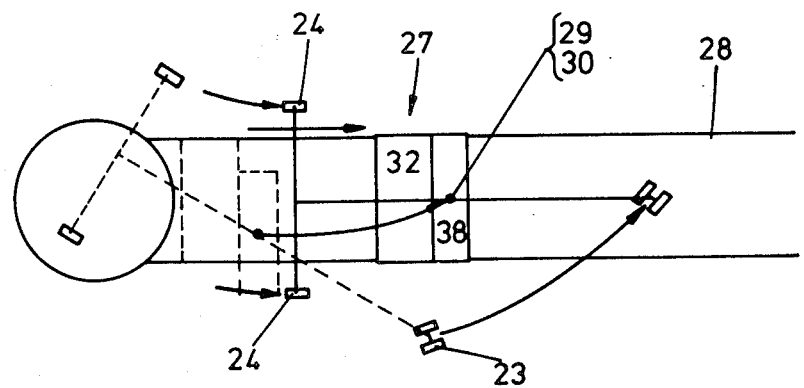
Figure 12G:
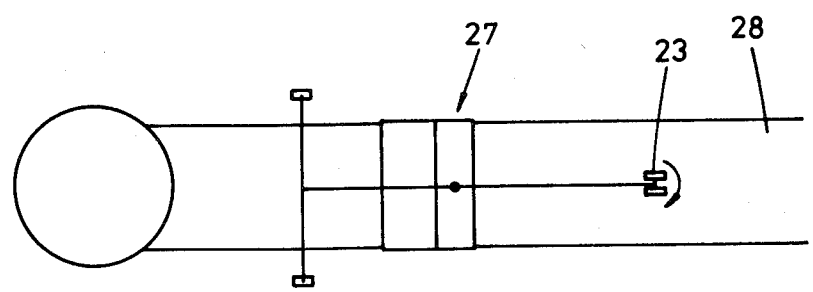
Figure 12H:
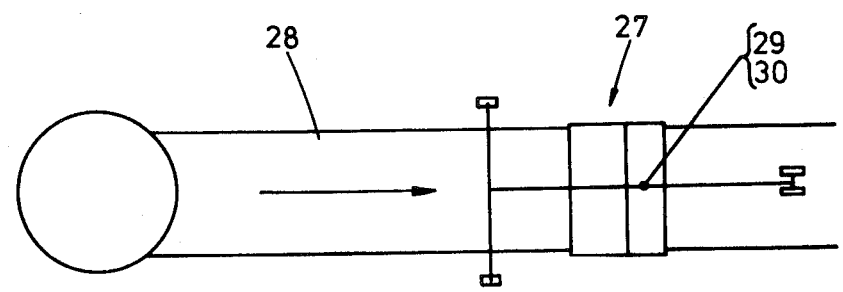

The nosewheel 23 is moved to the position shown in FIG. 12F and the trolley 27 and attached helicopter is moved further along the trackway 28. As illustrated in FIG. 12F, this manoeuvre moves the trolley 27 and helicopter from the position shown in broken outline to that shown in full outline in which the beam structure 38 is moved back to its centralised position, and the helicopter is correctly aligned with the trackway 28. It will be apparent that at this stage, the harpoon 25 can be re-engaged in the grid provided in the portion 31 of the trolley 27 if desired. The nosewheel 23 is then moved back to its fore-and-aft position (FIG. 12G) and the trolley 27 and attached helicopter are moved along trackway 28 into the storage area provided.

For take-off, the helicopter is moved out onto the deck by the trolley 27. The guide roller 61 at the upper end of the probe 29 enables the helicopter to be rotated about the probe 29 into a desired heading. The decklock system 79 is then re-engaged in the grid 26, the trolley 27 moved clear, and the helicopter launched from the deck-lock in a conventional manner.

Thus, in apparatus according to this invention, the trolley 27, probe 29, lock plunger 63 and extendable portion 31 of the embodiment of FIGS. 2 and 3 are operable from a remote control console on the ship so that personnel are not required in the exposed deck area at any time during either landing, traversing or taking off. This is a very important consideration especially when operating in a hostile environment or in extreme weather conditions. Furthermore, it will be apparent that operation of the apparatus of the invention is controlled entirely from the ship's deck thereby relieving the pilot of any responsibility during this dangerous manoeuvre.

The rigid mounting of the probe 29 on the trolley 27 ensures that moment reactions do not occur at the helicopter structure which is required to react shear forces only, thereby minimising the structural weight of fittings required on the helicopter. The embodiment of FIGS. 2 and 3 for use with a harpoon deck-lock system ensures a positive two-point attachment of the helicopter during deck manoeuvres.

Whilst embodiments of the apparatus have been described for use with a harpoon or other type of decklock system, it will be apparent that other modifications may be made without departing from the scope of the invention as defined in the appended claims. For instance, the interface may be modified so as to comprise locking means, such as a jaw-type locking means, that may be operable by the pilot so as to enable the helicopter to take-off from the probe 29 without having first to engage the deck-lock system. The apparatus can be used with other types of deck-lock systems that, whilst operation has been described in relation to two different tricycle undercarriage configurations, it is not limited thereto and can be adapted to operate with other configurations such as a tricycle undercarriage having a central tail wheel or a quadrupedal undercarriage. The raised trackway 28 is suitable for use in modifying an existing deck structure, however, it will be apparent that the trackway can also be formed by providing the inverted T-shaped slots 33 beneath a deck surface 22 during construction.

I claim as my invention:

1. Apparatus for moving a helicopter on the deck of a ship comprising a trackway on the deck and a movable trolley located on the trackway, wherein said trolley includes a vertically extendable and retractable probe having an upper end arranged for location in engagement means beneath the helicopter fuselage, said probe being power operated so as to selectively apply a downward force on the helicopter when said probe is located in said engagement means, probe mounting means carried by the trolley and laterally movable relative thereto so that said extended probe is easily locatable in the engagement means, and locking means operative to lock said mounting means and thereby the probe in a central position on the trolley after said probe is located in the engagement means.

2. Apparatus as claimed in claim 1, wherein said probe is hydraulically operated.

3. Apparatus as claimed in claim 1, wherein said probe mounting means comprises a beam structure slidably mounted on spaced-apart parallel guide bars carried by the trolley.

4. Apparatus as claimed in claim 3, wherein said locking means is located on the beam structure and is operatively associated with a laterally extending locking bar carried by the trolley so as to be capable of locking said mounting means in any position relative the trolley.

5. Apparatus as claimed in claim 4, wherein said locking means comprises a hydraulically operated sprag lock mechanism.

6. Apparatus as claimed in claim 1, wherein said engagement means comprises a trap and guide rails arranged to guide the upper end of said probe into the trap as a result of relative movement between the helicopter and the trolley.

7. Apparatus as claimed in claim 6, wherein said trap includes a vertically extending aperture for engagement by a lock plunger carried by the probe.

8. Apparatus as claimed in claim 1, wherein said trolley includes a plurality of guide rollers located in parallel longitudinally extending slots.

9. Apparatus as claimed in claim 8, wherein said slots have an inverted T-shape in cross-section.

10. Apparatus as claimed in claim 8, wherein said slots are provided in a trackway having an upper surface raised from and substantially parallel to said deck surface and longitudinally extending ramp portions along each side thereof.

11. Apparatus as claimed in claim 10, wherein said trolley includes a plurality of wheels arranged to run along said raised upper surface of said trackway.

12. Apparatus for moving a helicopter on the deck of a ship comprising a trackway on the deck and a movable trolley located on the trackway, wherein said trolley includes a vertically extendable and retractable probe having an upper end arranged for location in engagement means beneath the helicopter fuselage, probe mounting means carried by the trolley and laterally movable relative thereto so that said extended probe is easily locatable in the engagement means, and locking means operative to lock said mounting means and thereby the probe in a central position on the trolley after said probe is located in said engagement means, and wherein said engagement means comprises a trap and guide rails arranged to guide the upper end of said probe into the trap as a result of relative movement between the helicopter and the trolley, said trap including a vertically extending aperture for engagement by a lock plunger carried by the probe, said lock plunger being spring-loaded so as to protrude from an upper end of the probe and selectively movable by hydraulic pressure into a retracted position within said probe.

13. Apparatus for moving a helicopter on the deck of a ship comprising a trackway on the deck and a movable trolley located on the trackway, wherein said trolley includes a vertically extendable and retractable probe having an upper end arranged for location in engagement means beneath the helicopter fuselage, probe mounting means carried by the trolley and laterally movable relative thereto so that said extended probe is easily locatable in the engagement means, locking means operative to lock said mounting means and thereby the probe in a central position on the trolley after said probe is located in the engagement means, and a longitudinally movable portion remote from said probe mounting means having an upper surface configured for operative association with a deck-lock means carried by the helicopter.

14. Apparatus as claimed in claim 13, wherein said portion is movable by a hydraulic jack between extended and retracted positions.

* * * * *